(12) United States Patent
Moscovich et al.

(10) Patent No.: US 9,609,468 B1
(45) Date of Patent: *Mar. 28, 2017

(54) INTER-DEVICE BEARING ESTIMATION BASED ON BEAM FORMING AND MOTION DATA

(71) Applicant: Amazon Technologies, Inc., Seattle, WA (US)

(72) Inventors: Tomer Moscovich, San Francisco, CA (US); Oliver Huy Doan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/012,712

(22) Filed: Feb. 1, 2016

Related U.S. Application Data

(63) Continuation of application No. 14/309,744, filed on Jun. 19, 2014, now Pat. No. 9,253,592.

(51) Int. Cl.
  *G01S 1/08* (2006.01)
  *H04W 4/00* (2009.01)
  *H04W 40/20* (2009.01)
  *H04W 16/28* (2009.01)

(52) U.S. Cl.
  CPC .......... *H04W 4/008* (2013.01); *H04W 16/28* (2013.01); *H04W 40/20* (2013.01)

(58) Field of Classification Search
  CPC .................................. G01S 1/08; G01S 5/0273
  USPC ........... 342/354, 386, 407, 417, 424; 455/65
  See application file for complete search history.

(56) References Cited

U.S. PATENT DOCUMENTS

| | | | |
|---|---|---|---|
| 9,253,592 B1 * | 2/2016 | Moscovich | ........... H04W 4/008 |
| 2003/0069024 A1 | 4/2003 | Kennedy, Jr. | |
| 2010/0164807 A1 | 7/2010 | Tseng et al. | |

* cited by examiner

*Primary Examiner* — Lee Nguyen
(74) *Attorney, Agent, or Firm* — Lee & Hayes, PLLC

(57) ABSTRACT

Disclosed herein are techniques and systems for inter-device bearing estimation. Particularly, sensor fusion techniques are disclosed that combine motion data of a local computing device with beamforming data of the local computing device to determine a line-of-site path between the local computing device and a remote computing device. A motion sensor(s) of a local computing device may generate motion data from movement of the local computing device. The local computing device may further determine a direction, relative to the local computing device, of a beampattern in which an antenna(s) of the local computing device radiates energy, the beampattern direction being along a communication path between the local computing device and a remote computing device. The local device may then determine, based at least in part on the motion data and the direction of the beampattern, whether the communication path corresponds to a line-of-sight path between the local and remote devices.

20 Claims, 6 Drawing Sheets

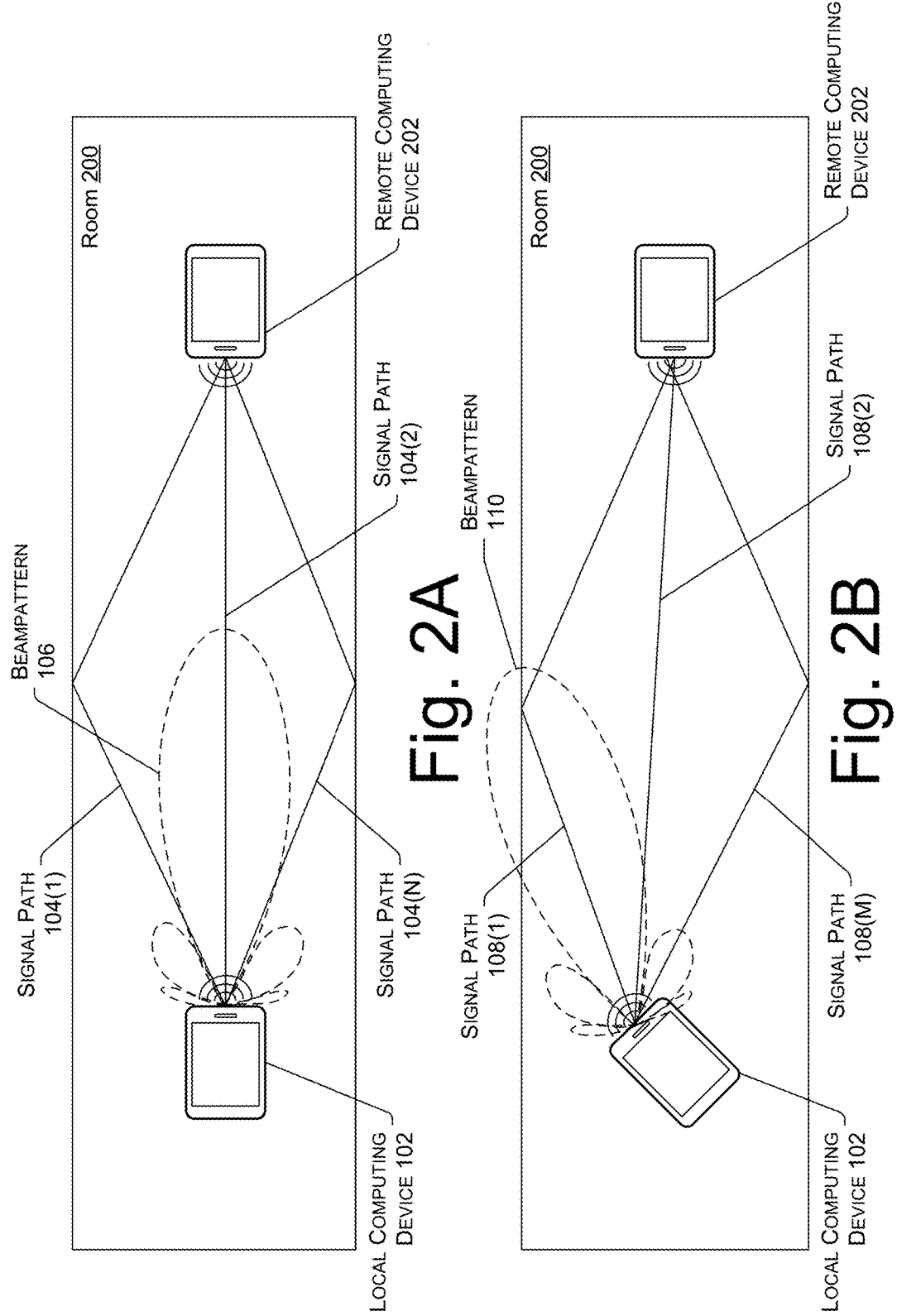

INTER-DEVICE BEARING ESTIMATION BASED ON BEAM FORMING AND MOTION DATA

CROSS REFERENCE TO RELATED APPLICATION

This application is a continuation of co-pending, commonly owned U.S. patent application Ser. No. 14/309,744, filed Jun. 19, 2014, and entitled "INTER-DEVICE BEARING ESTIMATION BASED ON BEAMFORMING AND MOTION DATA," the entirety of which is herein incorporated by reference.

BACKGROUND

As wireless technology continues to evolve, wireless devices are able to transmit data at higher throughputs and greater efficiency. This improvement in wireless data transmission opens the door to more sophisticated technologies that have heretofore been unrealized due to previous performance limitations in wireless data transmission. For example, consumers have only recently been able to take advantage of improved wireless product features with minimal disruption in performance, such as "mirroring" content from a tablet computer onto a television screen, using a mobile computing device as a remote control for another computing device, wirelessly sharing large files between user devices, and so on.

To this end, knowing where one wireless device is relative to another wireless device enables seamless connectivity (i.e., a high performance, low latency connection) between the two wireless devices, which becomes important when the devices are tasked with transferring large amounts of data to the other device. Although there are many known technologies for estimating the direction and/or location (i.e., bearing) of a remote device relative to a local device, current technologies are cost prohibitive to implement because consumer electronics manufacturers cannot competitively price their products with such costly technologies.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 2A is a diagram a remote computing device transmitting the multipath propagated wireless signal to the local computing device of FIG. 1A within a room that causes the multipath propagation.

FIG. 2B is a diagram of the remote computing device transmitting the multipath propagated wireless signal to the local computing device of FIG. 1B within the room.

DETAILED DESCRIPTION

Figure 1A:
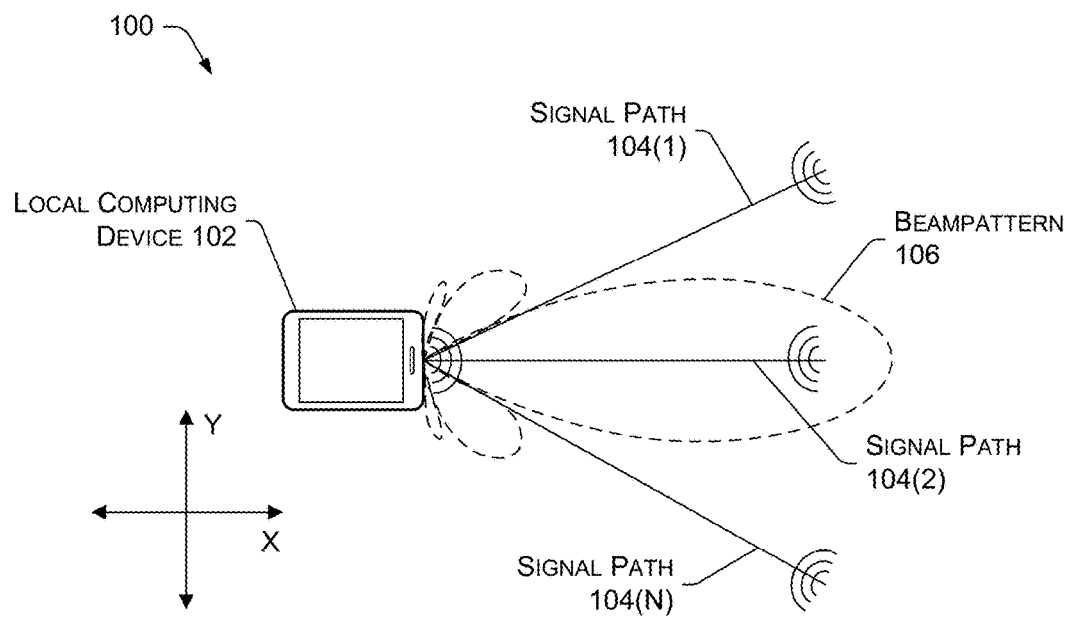
FIG. 1A is a diagram of a local computing device that is in receipt of a multipath propagated wireless signal from a remote computing device.

Disclosed herein are techniques and systems for inter-device bearing estimation. Particularly, sensor fusion techniques are disclosed that combine motion data of a local computing device with beamforming data of the local computing device to determine whether a communication path to a remote computing device is a line-of-site path or a reflection caused by multipath propagation of the wireless signal from a remote device. By discriminating between a line-of-site path and a reflection path, a high confidence bearing estimation of a relative direction and/or location of the remote device can be made. The estimation of the direction and/or location of the remote computing device enables a wide range of functionality and content sharing scenarios for a mobile computing device, such as home entertainment applications, inter-device interactions in the context of sharing content (e.g., passing content from one device to another by swiping it in the direction of the remote device), remote control functionality, video streaming, content mirroring, and so on. For example, image or video content on a tablet computer may be wirelessly transmitted to a television (TV) for display to an audience via the TV screen by receiving a gesture (e.g., toss/fling/swipe gesture) from a user of the tablet computer in a direction of the TV relative to the tablet computer. As another example, a user of a tablet computer may utilize the tablet computer as a remote control for video content displayed on a remotely located TV or other computing device. As such, the inter-device bearing estimation techniques disclosed herein become valuable for many wireless mobile applications.

Furthermore, the techniques disclosed herein take advantage of beamforming technology used with wireless components that adhere to the next generation wireless standards, such as 802.11ad. That is, next generation wireless devices implement wireless hardware and software with beamforming technology that is configured to utilize high throughput channels (e.g., 60 gigahertz (GHz) spectrum) for wireless data transmission. Beamforming is used in this context to overcome propagation loss, reduce interference, and increase the amount of information that can be carried by a given channel to improve signal transmission. If beamforming data is combined with motion data generated by motion sensors of the mobile device, a "complimentary filter" may be created that acts as a high accuracy directional sensor at no additional cost in terms of hardware of the mobile devices.

Accordingly, one or more motion sensors of a local computing device may generate motion data in response to movement of the local computing device. The local computing device may also determine a direction, relative to the local computing device, of a beampattern in which an antenna of the local computing device radiates energy, the direction of the beampattern being along a communication path between the local computing device and a remote computing device. The direction of the beampattern may be chosen to maximize a signal to noise ratio (SNR) for wirelessly received or transmitted signals along the communication path. The local computing device may then determine, based at least in part on the motion data and the direction of the beampattern, whether the communication path corresponds to a line-of-sight path between the local computing device and the remote computing device.

In some embodiments, a localization model may be utilized to determine whether a beampattern direction is in agreement with the motion data of the local device in terms of an expected direction from the movement of the local computing device. In this manner, the localization model may be utilized to interpret the motion data and the beamforming directional data to determine whether the current communication path is a line-of-sight path or a reflection. If the communication path is determined to be a line-of-sight path, the localization model may be updated with a bearing estimation of the remote device relative to the local device that points in a direction of the communication path. However, if the communication path is determined to be a reflection caused by multipath propagation, the local device may make a bearing estimation by deducing the line-of-sight path in another manner, such as by using dead reckoning to deduce the line-of-sight path and update the localization model with the bearing estimation.

FIG. 1A is a diagram 100 of a local computing device 102 that is in receipt of a multipath propagated wireless signal from a remote computing device. FIG. 1A is shown from a top elevation view, such as from a view looking down on the local computing device 102 from a ceiling of a room where the local computing device 102 is disposed. FIG. 1A is also illustrative of the frame of reference of the local computing device 102 by omitting the remote computing device from view, which illustrates that the local computing device 102 may not know the bearing of the remote computing device relative to the local computing device 102.

The signal paths 104(1), 104(2), . . . , 104(N) represent the different communication paths of a multipath propagated wireless signal of the remote computing device that arrive at a receiving antenna of the local computing device 102. Multipath propagation is the phenomenon where a transmitted signal arrives at a receiver via different paths. Assuming that there is nothing obstructing the shortest path possible between the local computing device 102 and the remote computing device, one of the signal paths 104(1)-(N) will represent the shortest path between the devices; also known as the "line-of-sight" path. Meanwhile, the remaining ones of the signal paths 104(1)-(N) other than the line-of-sight path represent reflections (or reflection paths). Reflection paths are signal paths that arrive at the local computing device 102 as a result of reflection from an object in the environment of the local computing device 102. Reflection paths may be caused by a number of things, including objects (e.g., buildings, walls, ceilings, etc.), or other substances (e.g., water) or media. Objects with flat surfaces (e.g., walls of a room) tend to do a better job of reflecting signals, which is why multipath propagation is often prevalent indoors where there are many objects in a relatively small, confined space.

Multipath propagation causes the same signal to be received as several signals with different phases, which may degrade the quality of the received signal, or otherwise cause inaccuracies, at a receiving device. To overcome the drawbacks of multipath environments, and to combat propagation loss and reduce interference in general, the local computing device 102 may be equipped with a beamforming antenna having multiple antenna elements to orient a beampattern 106 in a direction of a communication path with the highest SNR so that signal reception is improved at the local computing device 102. For instance, the local computing device 102 may determine beamforming parameters (e.g., weights or coefficients) that characterize the beampattern 106 in terms of gain, direction, shape, width, and so on, in order to focus the antenna of the local device 102 in a direction of signal path 104(2). Without any further information about where the remote device is relative to the local device 102, the signal path 104(2) that is aligned with the direction of the beampattern 106 may be assumed to represent a line-of-sight path between the two devices, as it may be a best guess estimate with the information available to the local computing device 102.

Figure 1B:
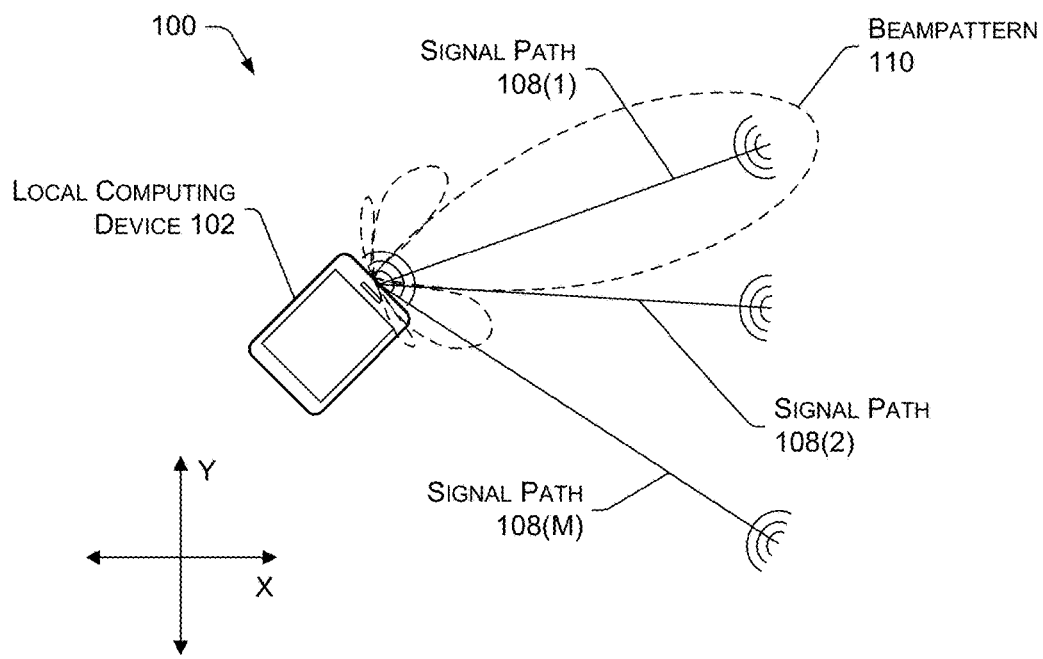
FIG. 1B is a diagram of the local computing device of FIG. 1A in receipt of a multipath propagated wireless signal after the local computing device has moved.

FIG. 1B is a diagram of the local computing device 102 of FIG. 1A after the local computing device 102 has moved. The local device 102 is now shown to receive a multipath propagated wireless signal represented by signal paths 108(1), 108(2), . . . , 108(M). The movement of the local computing device 102 may be of any conceivable type of motion, such as positional movement and/or rotational movement. For simplicity, FIG. 1B shows the local computing device 102 after it has been rotated about 45 degrees in a counterclockwise direction when looking at the local device 102 from the top elevation view perspective of FIGS. 1A and 1B. For further simplicity, FIGS. 1A and 1B are illustrated in two-dimensional (2D) planes. As such, the movement of the local computing device 102 is shown to occur within the 2D X-Y plane. Notwithstanding the example diagrams of FIGS. 1A and 1B, it is to be appreciated that the local computing device 102 is movable within a three-dimensional (3D) space that may be represented in terms of a Cartesian X-Y-Z coordinate system, or as azimuth and elevation directional and distance measurements.

The local computing device 102 may be further configured to detect its own movement and to generate motion data associated with the movement shown in FIG. 1B. In this example, the motion data may include an angular displacement (e.g., approximately 45 degrees counterclockwise), angular velocity, and/or angular acceleration. The detection of movement and generation of motion data may be enabled by suitable motion sensors included in the local computing device 102, which is described in more detail in FIG. 3, below.

Furthermore, since the local computing device 102 has rotated from FIG. 1A to FIG. 1B, a new beampattern 110 may be adapted with newly determined beamforming parameters to obtain a signal with the highest SNR. The beampattern 110 may be in the same or a different direction relative to the local computing device 102 as the beampattern 106 of FIG. 1A. In the specific example of FIGS. 1A and 1B, the beampattern 110 is indeed shown to be in a different direction relative to the local computing device 102 than the direction of the beampattern 106.

The task of the local computing device 102 is to determine a relative direction and/or location of the remote device. Accordingly, the local computing device 102 may be configured to combine the motion data generated from the movement of the local computing device 102 with the information from the beampattern 110 in a so-called "sensor fusion" approach to determine, with high confidence, whether the beampattern 110 is directed in a line-of-sight path between the local device 102 and the remote device. In this example, the local computing device 102 may determine whether the signal path 108(1) is a line-of-sight path or a reflection caused by multipath propagation of the wireless radio signal of the remote computing device.

Due to noise and associated drift that is inherent in the motion sensors of the local device 102, the motion data alone may be unsuitable for making a high accuracy bearing estimation. In this manner, the beamforming data that characterizes the beampattern 110 at least in terms of directionality may be combined with the motion data to create a "complimentary filter" for improving the bearing estimation of the remote device.

In some embodiments, the local computing device 102 may utilize a localization model stored on the local device 102 to ascertain whether the signal path 108(1) is a line-of-sight path or a reflection. The localization model may interpret motion data with associated beamforming data to either confirm that there is agreement between the motion data and the beamforming data to suggest that the signal path 108(1) is a line-of-sight path, or indicate that the motion data and the beamforming data are not in agreement, suggesting that the signal path 108(1) is instead a reflection. Determining whether there is agreement between the motion data and the beamforming data may include comparing the motion data to the beamforming data and determining, based on the comparison and with reference to the localization model, whether a change in rotation and/or position of the local device 102 corresponds to an angular displacement from a previous direction of a previous beampattern to the current direction of a current beampattern.

FIG. 2A is a diagram of a room 200 wherein a remote computing device 202 is transmitting the multipath propagated wireless signal (represented by the signal paths 104(1)-(N)) to the local computing device 102 from FIG. 1A. FIG. 2A is a top elevation view of the local computing device 102 and the remote computing device 202, such as when the devices 102 and 202 are viewed from a ceiling of the room 200. The room 200 is shown in FIG. 2A to be of a basic rectangular shape with four walls defining the space of the room 200, but it should be appreciated that the local and remote devices 102 and 202 may be disposed in any environment where multipath propagation may occur without changing the basic characteristics of the techniques disclosed herein. Although the remote device 202 is shown in the form of a tablet computing device, it is to be appreciated that the remote computing device may be mobile or stationary, and may include any suitable computing device, including a television (TV), set-top box (STB), game console, and the like.

Objects (e.g., furniture, mirrors, people, pets, etc.) within the room 200, and even the walls, floor, and ceiling of the room 200, may cause multipath propagation of wireless signals transmitted between the local and remote devices 102 and 202. In this manner, it can be seen that signal paths 104(1) and 104(N) are indeed reflections caused by opposing walls of the room 200, while signal path 104(2) is the line-of-sight path between the local and remote devices 102 and 202. Accordingly, the direction of the beampattern 106 is, in the examples of FIGS. 1A and 2A, indicative of the direction of the line-of-sight path.

FIG. 2B is a diagram of the remote computing device 202 that is now transmitting the multipath propagated wireless signal (represented by signal paths 108(1)-(M)) to the local computing device 102 of FIG. 1B after the local device 102 has rotated approximately 45 degrees counterclockwise. Particularly, the local computing device 102 may determine different parameters that adapt the beampattern 110 in a direction of the signal path 108(1) after the rotational movement due to a maximized SNR in the direction of the signal path 108(1) when the local device 102 is in the orientation of FIGS. 2A and 2B. As illustrated in FIG. 2B, the direction of the beampattern 110 cannot necessarily be assumed to align with a direction of the line-of-sight path. In other words, a beampattern pointing in the direction of the remote computing device 202 relative to the local computing device 102 may no longer yield the strongest signal at a receiver of the local computing device 102 such that a beamforming antenna does not choose to adapt a beampattern in the line-of-sight direction. Instead, the local computing device 102 in the position and orientation shown in FIG. 2B has, in this example, determined that the reflection 108(1) yields a maximized SNR at the receiver. As such, the direction of the beampattern 110 is no longer a reliable indicator of the line-of-sight path between the two devices 102 and 202.

In order to determine that the signal path 108(1) is a reflection, rather than the line-of-sight path, the local computing device 102 may utilize the aforementioned sensor fusion approach to combine the motion data generated from the movement of the local computing device 102 with the beamforming data characterizing the beampattern 110 at least in terms of directionality to ascertain whether the direction of the beampattern 110 an expected direction based on the motion data. In this example, a localization model may indicate that the direction of the beampattern 110 is not an expected direction based on the detected movement of the local computing device 102, which causes the local computing device 102 to designate the signal path 108(1) as a reflection rather than the line-of-sight path. The local computing device 102 may further estimate the line-of-sight direction based on previous information, such as previous beampattern data, previous motion states, etc.

In some embodiments, dead reckoning techniques may be utilized upon a determination that the direction of the beampattern 110 is in fact a reflection in order to estimate a bearing of the remote device 202. Dead reckoning techniques are known to a person having ordinary skill in the art, but generally include the process of calculating a current position of a device (e.g., the local device 202) by using a previously determined position (or "fix"), and advancing that position based upon known or estimated speeds (e.g., average velocity) over elapsed time, and a course (i.e., trajectory, direction, or path of travel). Accordingly, a current position may be based on a previous position of the local device 102, integration of speed (e.g., average velocity) or acceleration data, and, if applicable, a path of movement (e.g., direction of movement) of the local device 102, which may be obtained from a compass or magnetometer of the device 102.

In some embodiments, multiple bearing estimations may be made and recorded over time as the local device 102 moves within 3D space. The localization model may be continually updated with the bearing estimations over time to keep an accurate record of the relative direction and/or location of the remote device 202, which allows for advanced wireless functionality of the local device 102.

Figure 3:
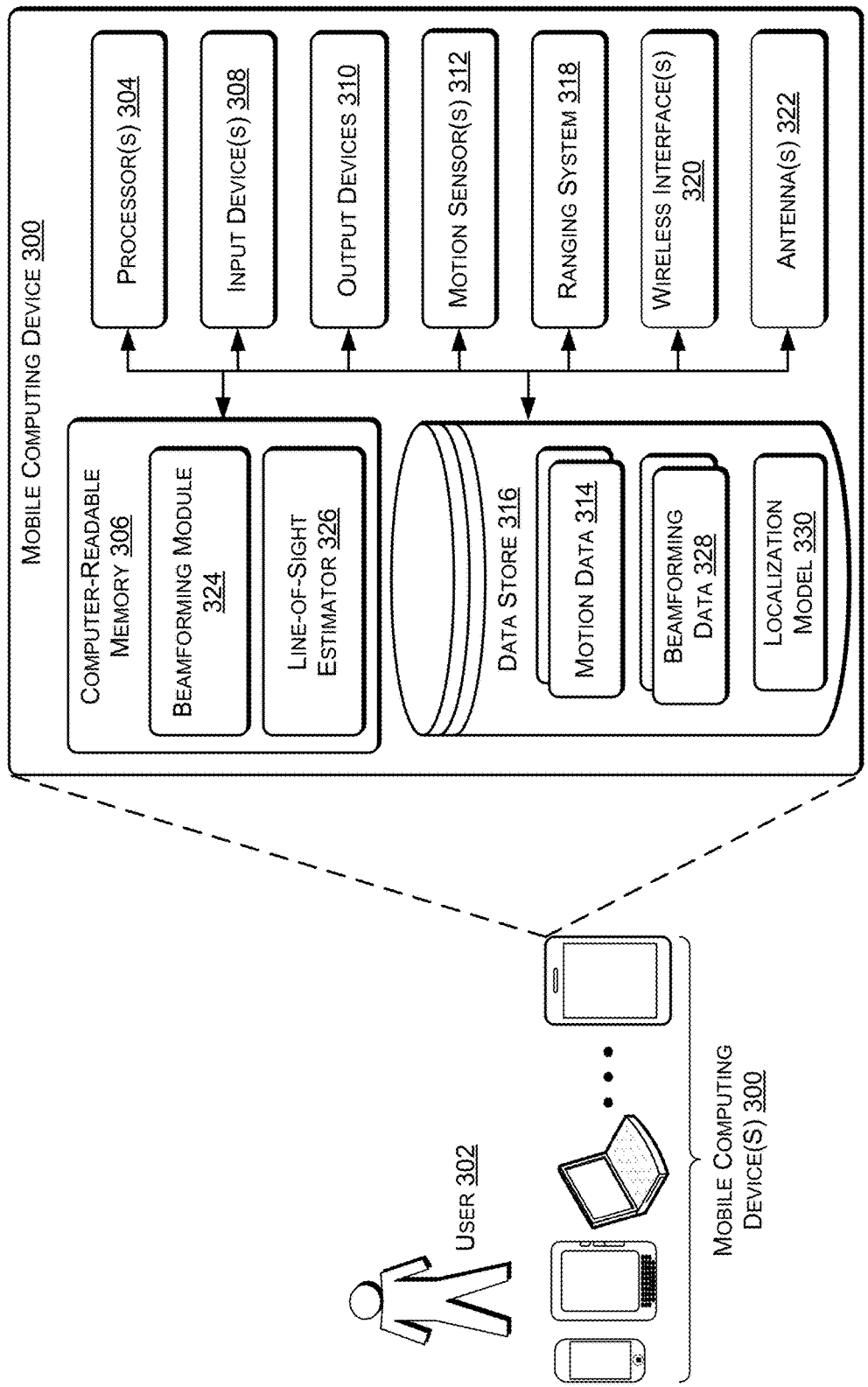
FIG. 3 is an example block diagram of an example mobile computing device configured to determine a line-of-sight path to a remote computing device based on motion data and beamforming data.

FIG. 3 is an example block diagram of an example mobile computing device 300 (sometimes referred to herein as a "mobile device" or "mobile computer") configured to determine a line-of-sight path to a remote computing device based on a sensor fusion approach disclosed herein. The mobile device 300 shown in FIG. 3 is only one illustrative example of a mobile computing device and is not intended to suggest any limitation as to the scope of use or functionality of the mobile device 300. Neither should the mobile device 300 be interpreted as having any dependency nor requirement relating to any one or combination of components illustrated in FIG. 3.

A user 302 may be associated with a mobile computing device 300. The user 302 may represent any suitable entity (e.g., business) or individual that may use the mobile device 300. The user 302 and the mobile device 300 may be positioned within any environment, whether an outdoor setting (e.g., an urban environment), an indoor setting (e.g., inside a room, a vehicle, etc.), or any other physical environment.

Furthermore, the mobile device 300 may be any suitable mobile computing device including, but not limited to, a tablet computer, a notebook or laptop computer, a mobile phone (e.g., smart phone), an electronic book (e-book) reading device (sometimes called an "e-reader" or "e-book reader"), a portable media player, a portable game player, a wearable computer (e.g., a smart watch, smart glasses, etc.), or any other suitable mobile computing device 300. The local computing device 102 of FIGS. 1A-2B may include some or all of the components and functionality of the mobile computing device 300. In some embodiments, the remote computing device 202 of FIGS. 2A and 2B may also include some or all of the components and functionality of the mobile device 300.

In at least one configuration, the mobile device 300 comprises one or more processors 304 and one or more forms of computer-readable memory 306. The mobile device may also include additional data storage devices (removable and/or non-removable) such as, for example, magnetic disks, optical disks, or tape. Such additional storage may include removable storage and/or non-removable storage. Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, compact disc read-only memories (CD-ROMs), digital video discs (DVDs), read-only memories (ROMs), random access memories (RAMs), erasable programmable read-only memories (EPROMs), electrically erasable programmable read-only memories (EEPROMs), flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by an Internet download.

The mobile device 300 may further include one or more input devices 308, including, without limitation, a touch screen display, physical buttons (e.g., keyboard or keypad), a camera(s), a microphone or microphone array for receiving voice input commands, pointing devices (e.g., mouse, pen, stylus, etc.), auxiliary remote controls, or any other suitable input device 308 for interfacing with the mobile device 300.

The mobile device 300 may further include one or more output devices 310 providing output to the user 302. Examples of suitable output devices include, without limitation, a display, a speaker(s), tactile feedback elements (e.g., vibrating keys of a keyboard/keypad), or any other suitable output device coupled communicatively to the processor(s) 304 and the computer-readable memory 306.

In some embodiments, the mobile device 300 further comprises one or more motion sensors 312 that are configured to generate motion data 314 based on sensed movement of the mobile device 300 about a 3D space. For example, the user 302, while using and/or carrying the mobile device 300, may cause movement of the mobile device 300, such as when carrying the mobile device 300 while walking within a room, such as the room 200 of FIGS. 2A and 2B. As the mobile device 300 is moved about a 3D space, the one or more motion sensors 312 may continually collect the motion data 314, which is shown to be storable by the mobile device 300 within a data store 316. The mobile device 300 may store the motion data 314 in the data store 316 permanently, or for a limited period of time or until a threshold amount of motion data 314 or a threshold time period is reached. For example, the mobile device 300 may be configured to buffer the motion data 314, and/or otherwise permanently store the motion data 314 in the data store 316.

The one or more motion sensors 312 may represent an inertial measurement unit (IMU) including gyroscopes, accelerometers, magnetometers or compasses, or any other suitable motion sensor including a camera or 3D sensor configured used for feature tracking, and so on. Moreover, any individual sensor or combination of motion sensors 312 may be utilized for obtaining the motion data 314 by providing six-component motion sensing. That is, the one or more motion sensors 312 may be configured to sense and generate the motion data 314 in the form of translational and/or rotational movement about a 3D space. The motion sensor(s) 312 may be configured to measure and generate data relating to the extent, rate, and/or acceleration of translational movement in 3D space (X, Y, and Z movement), as well as the extent, rate, and/or acceleration of rotation in 3D space (roll, pitch, and yaw). Measurements may be generated in terms of a 3D coordinate system, such as Cartesian (X, Y, and Z) or spherical coordinate systems. The motion data 314 may include measurements in terms of displacement (e.g., displacement since the preceding time log), velocity, and/or acceleration of translational movement (denoted by variables: d, v, a) and angular movement (denoted by variables: $\theta$, $\omega$, $\alpha$). The motion data 314 may further include times at which motion data 314 is collected at any suitable time interval so that a history of motion data 314 is collected and temporarily, or permanently, stored in the data store 316.

Furthermore, referential position information (e.g., magnetic North) may be utilized with the motion sensor(s) 312 to provide a frame of reference of the position and/or orientation of the mobile device 300. For example, orientation (e.g., tilt) relative to a ground plane ("ground"), such as the plane that is coplanar with, or parallel to, the surface of the earth, may be determined in order to detect how the mobile device 300 (i.e., how a reference plane local to the mobile device 300) is oriented relative to ground.

In some embodiments, the mobile device 300 may further include a ranging system 318 configured to provide distance and/or location information relative to the mobile device 300 in terms of a distance from the mobile device 300 to a remote device, such as the remote device 202, or another object of interest in the environment. In some embodiments, the motion sensor(s) 312 and the ranging system 318 may interoperate to generate the motion data 314 with the assistance of distance estimations determined by the ranging system 318. It is also to be appreciated that the motion sensor(s) 312 and the ranging system 318, while sometimes performing separate functions, may utilize the same or different hardware components, such as a camera utilized for ranging and/or motion sensing. The ranging system 318 may include, without limitation, radar, light detection and ranging (LIDAR), ultrasonic ranging, stereoscopic ranging, structured light imaging, Time-of-Flight (ToF), signal strength detectors, and so on. In one illustrative example, the ranging system 318 may comprise one or more depth cameras using infrared (IR) sensors and light emitting elements as a means of ToF imaging. In another illustrative example, the ranging system 318 is configured to measure a round trip ToF of a radio signal along a signal path, such as individual ones of the signal paths 104(1)-(N) and 108(1)-(M). In this example, the ranging system 318 may utilize respective timing circuits and time stamping techniques in both the local computing device 102 and the remote computing device 202 to time a round trip "ping" of a radio signal between the devices.

In some embodiments, the mobile device 300 may further include one or more wireless interfaces 320 coupled to one or more antennas 322 to facilitate a wireless connection to a network for communication with other computing devices, such as the remote computing device 202. The wireless interface 320 and antenna 322 coupling may be implemented on a chipset or similar module within the mobile device 300. The wireless interface 320 may be a radio frequency interface configured to implement one or more of various wireless technologies, such as Wi-Fi based on IEEE 802.11 standards (e.g., 802.11ad), short range wireless frequencies such as Bluetooth®, or any suitable wireless communication protocol. Furthermore, although a wireless interface 320 is shown in FIG. 3, it is to be appreciated that the mobile device 300 may include a wired communication interface using electrical couplings such as wires, pins, connectors, etc. to communicate with other computing devices using a wired communication protocol (e.g., universal serial bus (USB), high-definition multimedia interface (HDMI), etc.).

In some embodiments, the antenna(s) 322 may comprise an array of omni-directional antenna elements configured as an active array to detect radio signals of any suitable frequency (e.g., 60 GHz) and enabled with beamforming functionality. Any suitable number of antenna elements in any suitable arrangement of an antenna array may be utilized, such as antenna elements distributed in a 3D arrangement, which may enable steering beams about a 3D space during beamforming. In other words, the antenna(s) 322 may, in combination with the processor(s) 304 and a beamforming module 324 stored in the computer-readable memory 306 and executable by the processor(s) 304, determine beamforming parameters that characterize a beampattern in a particular azimuth and elevation direction relative to the mobile device 300. The beampattern focuses the antenna 322 in a direction of a communication path to a remote device for improved SNR at the receiver by applying parameters (e.g., weights or coefficients) to modify gain at individual antenna elements. In some embodiments, a predetermined gain may be applied uniformly or differently across the antenna elements of the antenna(s) 322 to provide desired signal amplitudes at individual antenna elements.

It is noted that beamforming may be used to improve signal reception even if one of the two devices is not configured with beamforming functionality; just one of the devices may be enabled with beamforming functionality to take advantage of reduced interference and improved data transfer performance.

In some embodiments, the computer-readable memory 306 may be used to store any number of functional, or executable, components, such as programs and program modules that are executable on the processor(s) 304 to be run as software. Each component stored in the computer-readable memory 306 may comprise computer-executable instructions that, when executed, cause the one or more processors 304 to perform acts and to implement techniques described herein. Each component may be in the form of data structures, program modules, or other data. As mentioned above, the computer-readable memory 306 may include the beamforming module 324, and it may further include a line-of-sight estimator 326, among other possible modules.

The beamforming module 324 may be configured to determine parameters corresponding to one or more beampatterns, such as the beampatterns 106 and 110, having directionality in order to focus the antenna(s) 322 in the direction of a signal path used for communication with a remote computing device, such as the remote computing device 202. For example, the beamforming module 324 may apply beamformer coefficients or weights to radio signals received at or transmitted from the antenna 322, effectively focusing and increasing gain for the radio signals. The beamforming parameters that characterize the beampattern may be stored in the data store 316 as beamforming data 328, which is accessible to the mobile device 300 for obtaining information (e.g., direction information) associated with beampatterns.

In some embodiments, beamformer coefficients may be pre-calculated to reduce overall computational cost, while in other embodiments, beamformer coefficients may be calculated on-the-fly. Beamformer coefficients may be considered a form of weighting applied to the radio signals at the antenna(s) 322 in order to modify those signals for generating a beampattern.

In some embodiments, the beamforming module 324, in combination with the antenna(s) 322, is configured to perform adaptive beamforming where channel gain is estimated and fed back to the beamforming module 324 to adapt a beampattern based on the feedback by processing (e.g., applying a set of beamformer coefficients to) radio signals at the antenna(s) 322 to generate processed data that effectively constructs beampatterns, or effective volumes of gain or attenuation (i.e., 3D beampatterns). A defined beampattern may have a particular gain, attenuation, shape, topology, size, directivity (via a beampattern direction), and so forth that are exhibited in the processed data to cause the antenna(s) 322 to act as a highly directional antenna(s) 322. A beampattern may exhibit a plurality of lobes, or regions/volumes of gain, with gain predominating in a particular direction designated as a beampattern direction. A main lobe (sometimes referred to herein as "the beam") extends along the beampattern direction to listen for radio signals at any range from the antenna(s) 322 along the beampattern direction. Accordingly, beamforming provides a "listening beam" with directionality or directivity that points to a received signal to increase the SNR at the receiver while filtering out extraneous radio signals to reduce interference. In some embodiments, several different simultaneous beampatterns may be defined by applying different sets of beamformer coefficients to the radio signals at the antenna(s) 322, and each beampattern may have a different shape, direction, gain or attenuation, and so forth, as desired.

The beamforming data 328 may be utilized to obtain direction information of one or more beampatterns that are adapted by the beamforming module 324. In some embodiments, the beamforming data 328 may provide an initial estimation of a line-of-sight path to a remote computing device because it is likely that the SNR is maximized in the line-of-sight direction to the remote computing device. However, it is not always the case that the beampattern direction aligns with the line-of-sight path.

The line-of-sight estimator 326 may be configured to determine whether a current communication path is a line-of-sight path or a reflection path. The ability of the line-of-sight estimator 326 to discriminate between line-of-sight paths and reflection paths allows the line-of-sight estimator 326 to determine the line-of-sight direction (i.e., direction vector) and/or location (direction plus distance or 3D coordinates from a reference point) of a remote computing device, such as the remote computing device 202, relative to the mobile device 300. The line-of-sight estimator 326 may utilize, at least in part, the motion data 314 generated by the motion sensor(s) 312 in combination with the beamforming data 328 via a sensor-fusion approach to determine whether a current beampattern direction is along the line-of-sight path. This determination may then be used to estimate a bearing (i.e., direction and/or location) of the remote computing device.

It is recognized that using the motion data 314 alone is insufficient for estimating the bearing of a remote device because there is no external reference for the motion sensor(s) 312 and as the mobile device 300 moves, any bearing estimation would start to drift very quickly due to noise in the motion sensor(s) 312. Accordingly, the mobile device 300, relying solely on the motion data 314 would soon lose track of where it is relative to other devices with which it is communicating. In this manner, the beamforming data 328 that indicates at least a direction (e.g., azimuth and elevation directions in terms of radians or degrees from a reference direction) of a current beampattern, and hence a direction of a current communication path, may be combined with the motion data 314 and used as an external reference to the motion data 314, acting to effectively restrict the space to areas where the devices can possibly be relative to each other. In addition to directionality, the beamforming data 328 may further include information associated with the other signal paths (e.g., SNR's, directions, etc.) that have been avoided due to having relatively lower SNR than the current signal path used for wireless communication of data between the mobile device 300 and a remote device.

In some embodiments, a localization model 330 may be stored in the data store 316. The localization model 330 may comprise a collection of data that describes correlations between movement of the mobile device 300 and beamforming directionality changes relative to the mobile device 300. That is, the localization model 330 effectively translates movement of the mobile device 300 into expected beamforming directionality changes such that the data in the localization model 330 describes expected beamforming direction relative to the mobile device 300 for any type and extent of movement detected by the motion sensor(s) 312 of the mobile device 300.

As the mobile device 300 moves throughout space, the motion data 314 and beamforming data 328 may be collected and stored in the data store 316. The line-of-sight estimator 326 is configured to access this collected data and compare how the collected data matches the localization model 330 in order to output a determination as to whether the current communication path used by the beamforming module 324 is a line-of-sight path to a remote computing device. This line-of-sight path determination may be based on a variance between the collected data and the localization model 330.

For example, the motion data 314 may reflect, at a given time, a 45 degree clockwise rotational movement of the mobile device 300, and the beamforming data 328 may correspondingly reflect a change in direction of a beampattern relative to the mobile device 300 as a 45 degree counterclockwise angular displacement. By consulting the localization model 330, which contains data regarding a particular beamforming directionality change for a 45 degree clockwise rotational movement of the mobile device 300, the line-of-sight estimator 326 may determine that there no deviation, or a deviation below a threshold deviation, between the 45 degree counterclockwise angular displacement reflected in the beamforming data 328 and the particular beamforming directionality change in the localization model 330, and that the counterclockwise rotational direction of the beampattern angular displacement matches the rotational direction of the particular beamforming directionality change in the localization model 330. If the aforementioned deviation is at or below the threshold, and if the rotational directions match between the beamforming data 328 and that which is reflected in the localization model 330, the line-of-sight estimator 326 may determine that there is agreement (or correspondence) between the collected motion data 314 and beamforming data 328, and the direction of the beampattern after the 45 degree clockwise rotational movement of the mobile device 300 may be designated as the line-of-sight path to a remote device with high confidence and used as a bearing estimation of the remote device relative to the mobile device 300. In this manner, the line-of-sight estimator 326 may look to the localization model 330 to interpret any type and extent of movement of the mobile device 300 with corresponding directionality changes reflected in the beamforming data 328 to determine whether the beams adapted by the beamforming module 324 are what is to be expected from the data in the localization model 330. In some embodiments, a confidence level (or degree of confidence) in the determination of the line-of-sight path may represent a quantitative metric as to how strongly the collected data (i.e., motion data 314 and beamforming data 328) matches the localization model 330, and this confidence level may be an indicator of whether there is "agreement" between the motion data 214 and the beamforming data 328 according to the localization model 330.

The localization model 330 may be generated or built in any suitable manner, including pre-populating the localization model 330 based on empirical research, generation of training data from multiple wireless computing devices configured to collect motion data and beamforming data upon subjecting the wireless devices to various movement conditions, and the like. Over time, as the mobile device 300 is used/moved and bearing estimations are made by the line-of-sight estimator 326, the localization model 330 may be continuously updated, possibly with the use of machine learning techniques for improving bearing estimations over time.

In some embodiments, if the localization model 330 shows that there is agreement between the motion data 314 and the beamforming data 328, then the current signal path for communication is designated a line-of-sight path. If the localization model 330 indicates a lack of agreement (perhaps beyond a threshold or similar criteria), the current signal path is designated as a reflection, and the line-of-sight path may then be estimated using previously obtained information (e.g., dead reckoning, other available signal path distances, etc.). In some embodiments, with information in the beamforming data 328 as to other available signal paths that were not chosen by the beamforming module 324 due to exhibiting relatively lower SNR's than the current signal path, the line-of-sight estimator 326 may be configured to select from the remaining signal paths to determine whether one of those other signal paths can be designated as a line-of-sight path. In some instances, however, such as when the line-of-sight path is blocked by an object between the mobile device 300 and the remote device, none of the signal paths available to the beamforming module 324 may be the line-of-sight path, in which case, the line-of-sight path may be deduced by other techniques, including dead reckoning. In such a scenario, a history of the collected motion data 314 (e.g., a time window of the past 5 seconds of motion data 314) may provide more context as to the trajectory of the mobile device 300.

In some embodiments, the localization model 330 is an explicit model that is continuously updated over time as the mobile device 300 moves because multipath propagated signal paths change continuously with respect to the antenna(s) 322 of the mobile device 300. In yet other embodiments, the localization model 330 may be a machine learning model that is trained to interpret the motion data 314 and the beamforming data 328. Any suitable machine learning model may be used for a trained localization model 330 including, without limitation, an artificial neural network, a hidden Markov model (HMM), a Kalman filter (or enhanced Kalman filter), a Bayesian network (or Bayesian belief network), a support vector machine (SVM), a decision tree, or any suitable machine learning model that uses algorithms to effectively map input (e.g., motion data) to output (direction vectors), and the model may be based on supervised or unsupervised machine learning techniques.

As bearing estimations are made over time as the mobile device 300 moves, the localization model 330 may be repeatedly updated. As such, the localization model 330 may, at any moment, include data as to the absolute position and orientation of the mobile device 300 as well as the remote computing device in wireless communication with the mobile device 300, the bearing estimations of a relative direction and/or location (i.e., distance estimations) of the remote device, confidence levels associated with bearing estimations and with line-of-sight path determinations, and so on. Statistics on how often the beampattern direction coincides with the line-of-sight path may be collected for inclusion in the localization model 330 so that the line-of-sight estimator 326 may learn from the historical data to better predict whether current beampattern directions align with the line-of-sight path. The line-of-sight estimator 326 may be further configured to restrict a search space for the line-of-sight path to particular angle ranges (e.g., azimuth angle range and elevation angle range) to exclude improbable or impossible spatial zones from consideration, thereby increasing efficiency and decreasing computational cost of the system.

The processes described in this disclosure may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other architectures as well.

Figure 4:
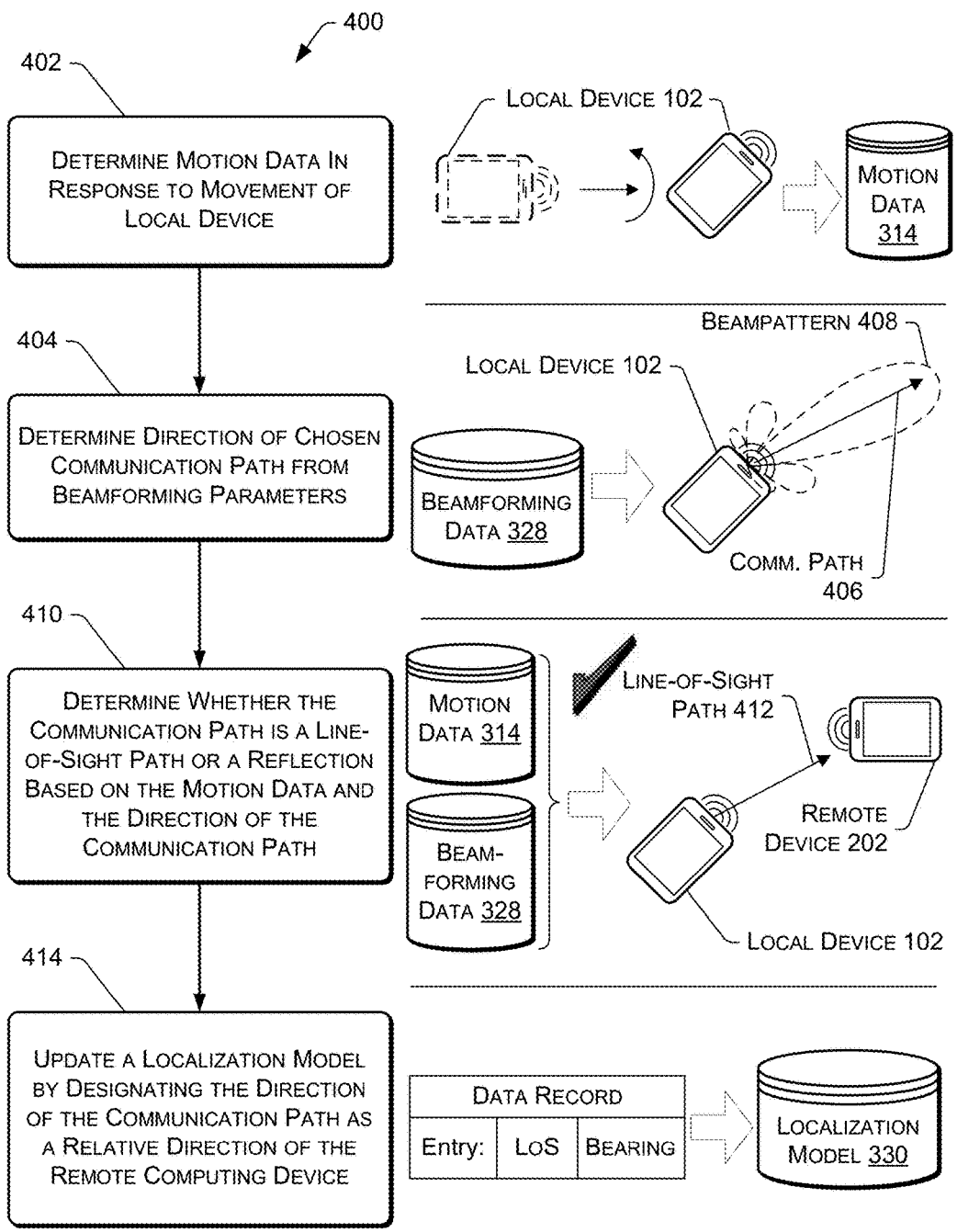
FIG. 4 is a flow diagram of an illustrative process for determining whether a current communication path is a line-of-sight path between two devices based on motion data and beamforming data.
Figure 5:
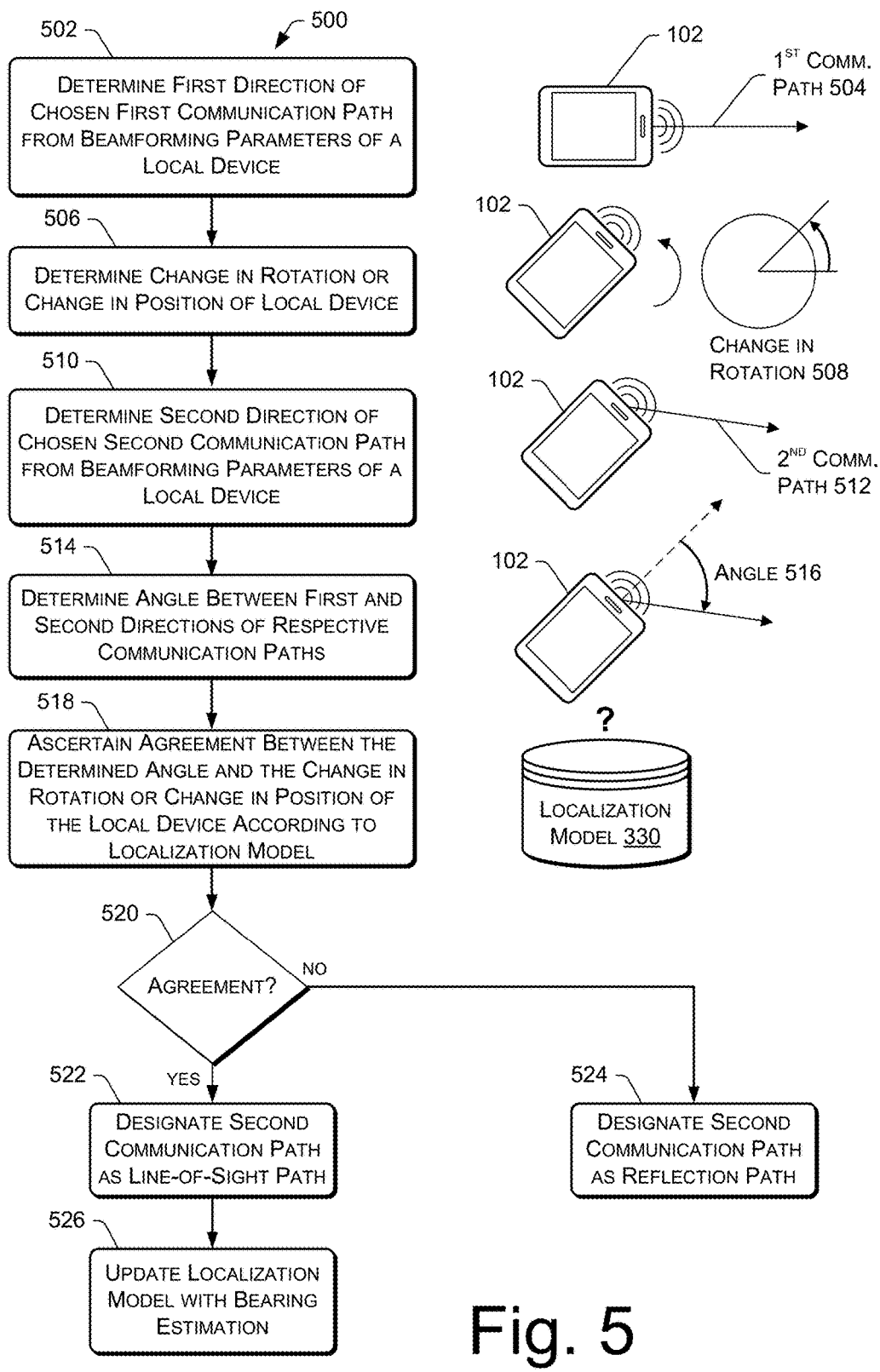
FIG. 5 is a flow diagram of a more detailed illustrative process for determining whether a current communication path is a line-of-sight path between two devices based on motion data and beamforming data.
Figure 6:
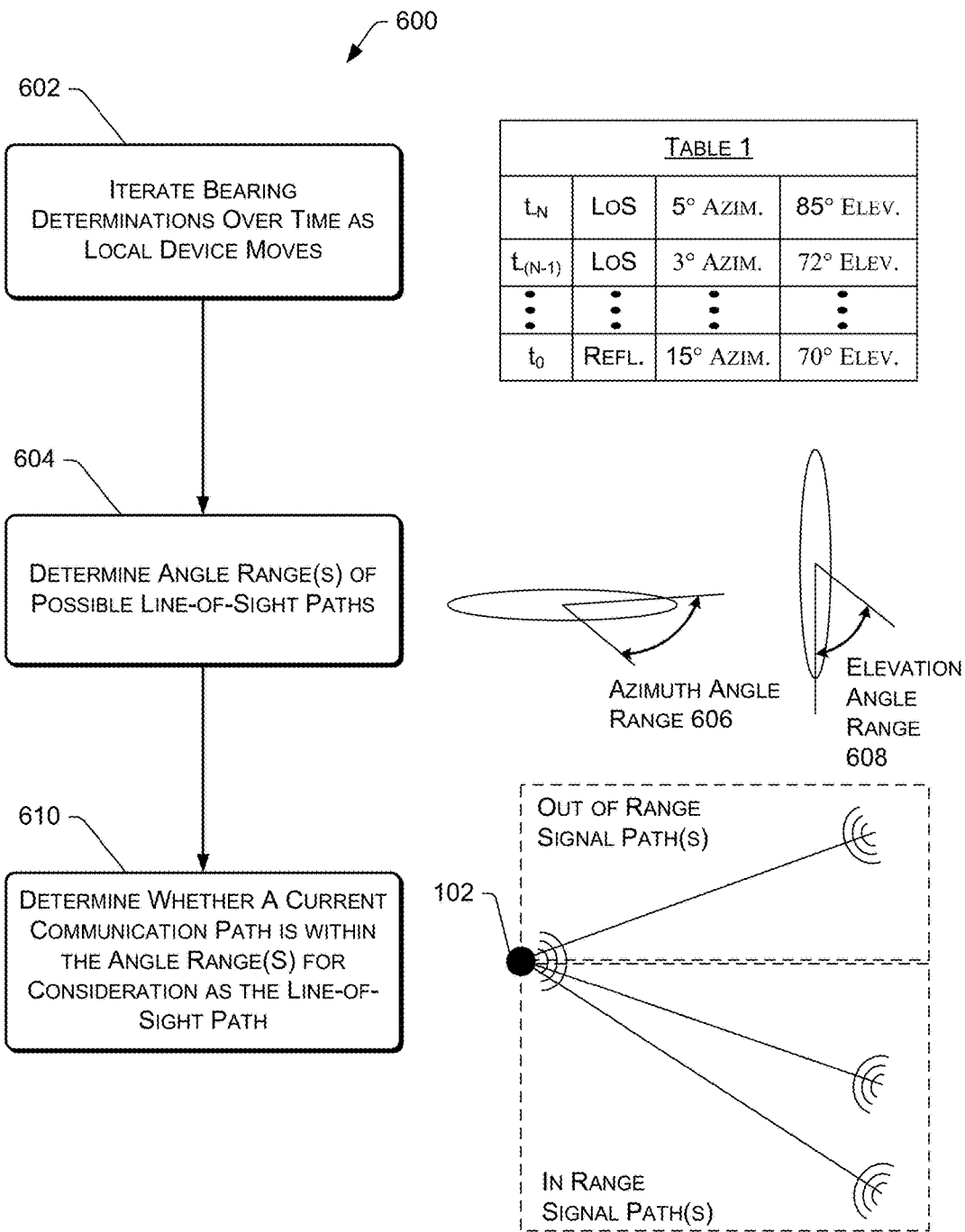
FIG. 6 is a flow diagram of an illustrative process for restricting a search space for a line-of-sight path based on a history of bearing determinations.

FIGS. 4-6 are flow diagrams of illustrative processes. At least the local device 102 involved in the processes of FIGS. 4-6 includes at least some of the functionality and associated components of the mobile device 300 of FIG. 3, and as such, the processes of FIGS. 4-6 are described with reference to the components of the mobile device 300 of FIG. 3. The remote computing device 202 may or may not include similar functionality and components to that of the local computing device 102 in the context of the processes of FIGS. 4-6.

FIG. 4 is a flow diagram of an illustrative process 400 for determining whether a current communication path is a line-of-sight path between two devices based on a combination of motion data 314 and beamforming data 328. Each step of the process 400 is shown next to an associated diagram that further illustrates the individual steps of the process 400.

At 402, motion data, such as the motion data 314, is generated in response to movement of the local device 102 detected by one or more motion sensors 312 of the local device 102. Although any conceivable movement within 3D space is contemplated at 402, the diagram to the right of 402 illustrates, for simplicity, that the movement of the local device 102 may comprise positional movement and/or rotational movement in a 2D plane. Accordingly, the motion data 314 may include displacement, velocity, and/or acceleration measurements (translational and/or rotational), as well as time (e.g., date and time) information, or any other suitable information associated with the movement.

At 404, a direction of a current communication path 406 between the local device 102 and a remote device 202 may be determined from the beamforming data 328. This direction determination may be based on a direction of a beampattern 408 adapted by the beamforming module 324 to focus the antenna(s) 322 along the communication path 406 so that a maximum SNR is utilized at the local computing device 102 for radio signal reception.

At 410, the line-of-sight estimator 326 may determine whether the communication path 406 is a line-of-sight path 412 between the local and remote devices 102 and 202. The determination at 410 may be based on combining the motion data 314 and the beamforming data 328 to ascertain whether there is agreement between the motion data 314 and the beamforming data 328. In this sense, the beamforming data 328 acts as an external reference for the motion data 314 for making the determination at 410 so that any inherent noise in the motion sensor(s) 312 is mitigated. In the diagram to the right of 410, the line-of-sight estimator 326 has determined that the communication path 406 is the line-of-sight path 412, perhaps with some confidence level (e.g., 90% confidence) based on the ascertained agreement according to the localization model 330. For example, if recent, preceding determinations at 410 indicate that previous communication paths corresponded to line-of-sight paths, a confidence level of a current determination at 410 may be higher, whereas if the recent, preceding determinations indicate that previous communication paths correspond to reflections, causing confidence in bearing estimates of the remote device to decrease, the confidence level of the determination at 410 may be relatively lower.

At 414, the localization model 330 is updated with a bearing estimation of the remote computing device 202 by designating, in the localization model 330, the direction of the current communication path 406 as the current direction of the remote computing device 202, relative to the local computing device 102. The updating the localization model 330 at 414 may include feeding back data to the localization model 330, including the beamforming data 328, the motion data 314, the line-of-sight path 412 determination made at 410 and perhaps the associated confidence of the determination at 410, among other data that may be used to update the localization model 330 at 414. In this manner, the process 400 may iterate over time in response to movement of the local computing device 102 and may continuously update the localization model 330 with bearing estimations of the remote device 202. In some embodiments, a confidence level may be associated with the bearing estimations, and the confidence level of the bearing estimations may be higher when line-of-sight paths are identified at 410, and may decrease over time if only reflections are seen at 410 over multiple iterations of the process 400.

In some embodiments, the beamforming data 328 may include information regarding other available signal paths in addition to the current communication path 406, such as a set of other signal paths, directions of each signal path, an SNR associated with each signal path, and so on. This additional signal path information may allow the line-of-sight estimator 326 to determine which signal path from a set of multiple signal paths available to the local device 102 (including the signal path corresponding to the current communication path 406) is the line-of-sight path. This assumes that the line-of-sight path is an available signal path and is not blocked by an object in the environment. In this scenario, the line-of-sight estimator 326 may determine which signal path is in maximum agreement with the motion data to suggest that it is the line-of-sight path, or it may select from the other signal paths using other techniques (e.g., distance estimations of each signal path).

FIG. 5 is a flow diagram of a more detailed illustrative process 500 for determining whether a current communication path is a line-of-sight path between two devices based on motion data 314 and beamforming data 328. Some of the steps of the process 500 are shown next to an associated diagram that further illustrates those individual steps of the process 500.

At 502, a first direction of a first communication path 504 is determined by the line-of-sight estimator 326. The first communication path 504 may be chosen by the beamforming module 324 as having the highest SNR relative to other available signal paths between the local device and a remote device. The line-of-sight estimator 326 may access the beamforming data 328 to determine the parameters associated with the first direction of a beampattern adapted by the beamforming module 324 to focus the antenna(s) 322 in the first direction along the first communication path 504. In some embodiments, the first communication path 504 may be designated as a line-of-sight path between the local device 102 and the remote device that are transmitting wireless signals along the first communication path 504. In other words, the first direction may be an initial estimate that is taken as the most likely direction to the remote device, perhaps with an associated confidence level that the designation of the first communication path 504 as the line-of-sight path is correct.

At 506, the one or more motion sensors 312 may detect movement of the local computing device 102, and in response to the detected movement, determine a change in rotation 508 or a change in position of the local computing device 102. For simplicity, the diagram to the right of 506 shows that the motion sensor(s) 312 determines the change in rotation 508 as being in a counterclockwise direction. Accordingly, the direction of rotation may also be identified, such as whether the rotation is in a clockwise or counter-clockwise direction.

At 510, the line-of-sight estimator 326 may determine a second direction of a second communication path 512 chosen by the beamforming module 324 as having the highest relative SNR after the movement of the local device 102 at 506. The line-of-sight estimator 326 may access the beamforming data 328 to determine the parameters associated with the second direction of a different beampattern adapted by the beamforming module 324 to focus the antenna(s) 322 in the second direction along the second communication path 512. The second communication path 512 may be one of many possible signal paths that is selected for communication using beamforming, and may be in a different direction relative to the local device 102 than the first direction associated with the first communication path 504.

At 514, the line-of-sight estimator 326 may determine an angle 516 between the first direction (i.e., the direction of the first communication path 504 that was selected before the movement of the local device 102) and the second direction (i.e., the direction of the second communication path 512 that is selected after the movement of the local device 102). In some embodiments, a determination may be made as to whether the first direction is closer to the second direction in a clockwise or a counterclockwise direction. The diagram to the right of 514 shows that, in this example, the first direction is closer to the second direction in the counter-clockwise direction. In this manner, the angle 516 determined at 514 is an indicator of how the beamforming module 324 is adapting beampatterns in response to the movement of the local device 102.

At 518, the line-of-sight estimator 326 may ascertain whether there is agreement between the angle 516 determined at 514 and the change in rotation 508 or the change in position determined at 506 according to a localization model, such as the localization model 330. The localization model 330 may contain any suitable data used to ascertain agreement between the motion data 314 and the beamforming data 328, such as by analyzing signs of rotation (e.g., clockwise vs. counterclockwise), signs of translational movement (e.g., positive vs. negative X, Y, or Z directional movement), a history of previous motion states, translational or rotational speed or acceleration, relative distance or ranging measurements, and so on.

At 520, a determination is made as to whether there is agreement between the motion data 314 and the beamforming data 328 based on the ascertaining at 518. For example, if the sign of the change in rotation 508 matches the rotational direction of the first direction relative to the second direction (e.g., if the change in rotation 508 is counterclockwise and the first direction is closer to the second direction in a counterclockwise direction), the second communication path 512 may be designated as the line-of-sight path between the local device 102 and the remote device at 522. In some embodiments, a confidence level of the designation at 522 is determined that indicates the probability that the designation at 522 is correct. The confidence level may be based on the amount of available information, such as a history of previous motion states, other external reference points utilized, ranging information, and the like, which may increase the confidence level.

If it is determined at 520 that the motion data 314 and the beamforming data 328 do not agree according to the localization model 330, the second communication path 512 may be designated as a reflection path at 524. A confidence level may also be associated with the designation at 524 to indicate the probability that the designation at 524 is correct, and the confidence level may again be based on the amount of available information. Upon the process proceeding to 524 after the decision at 520, the second communication path 512 may be ignored and no longer considered a possible line-of-sight path. In some embodiments, a bearing estimation may be determined after 524 using other techniques based on previously obtained information, such as using dead reckoning, feature tracking within an environment using cameras and/or 3D sensors, and so on.

If the designation of the second communication path 512 as a line-of-sight path is made at 522, the process 500 may proceed to 526 the localization model 330 is updated with a bearing estimation of the remote computing device 202 by designating, in the localization model 330, the direction of the second communication path 512 as the current direction of the remote computing device 202, relative to the local computing device 102. The updating the localization model 330 at 526 may include feeding back data to the localization model 330, including the beamforming data 328, the motion data 314, the line-of-sight path determination made at 522 and perhaps the associated confidence of the determination at 522, among other data that may be used to update the localization model 330 at 526. In this manner, the process 500 may iterate over time in response to movement of the local computing device 102 and may continuously update the localization model 330 with bearing estimations of the remote device 202. In some embodiments, a confidence level may be associated with the bearing estimations, and the confidence level of the bearing estimations may be higher when line-of-sight paths are identified at 522, and may decrease over time if only reflections are seen at 524 over multiple iterations of the process 500.

FIG. 6 is a flow diagram of an illustrative process 600 for restricting a search space for a line-of-sight path based on a history of bearing determinations/estimations. At 602, multiple bearing determinations may be made and recorded in the data store 316 over time as the local device 102 moves about a 3D space. For example, a process similar to the process 400 or the process 500 may be utilized to estimate the bearing of a remote device relative to the local device 102 in response to movement of the local device 102. In some embodiments, a localization model, such as the localization model 330, may be continuously updated with estimates of the bearing of the remote device and associated times that the bearing estimations were made. Table 1, shown to the right of 602, illustrates example times that corresponding bearing estimations were made, as well as information as to whether a current communication path was designated as a line-of-sight (LoS) path or a reflection, and the directionality of the bearing estimation relative to the local device 102 in terms of azimuth and elevation directions.

At 604, the line-of-sight estimator 326 may determine an angle range, relative to the local computing device 102, of possible/candidate directions of line-of-sight paths. In some embodiments, the angle range may be in terms of an azimuth angle range 606 and/or an elevation angle range 608, and the angle range may be based on a history of the bearing determinations made at 602. The number of previous bearing estimations that the line-of-sight estimator 326 examines (i.e., the width of the recent history window) may depend upon various factors, including how much auxiliary information is available to the line-of-sight estimator 306. In some embodiments, a motion model based on the motion data 314 may be analyzed independently from a beamforming model based on the beamforming data 328 to determine a rotation offset that minimizes the difference between the two models to determine the angle range at 604.

At 610, the line-of-sight estimator 326 may determine which ones of the available signal paths fall within the angle range determined at 604 (sometimes referred to as "in-range" signal paths), and which signal paths fall outside of the angle range (sometimes referred to as "out-of-range" signal paths). This includes determining whether a current communication path chosen by the beamforming module 324 is within the angle range. Those signal paths that are "in-range" (i.e., the signal paths having directionality, relative to the local device 102, within the angle range determined at 604) are considered as candidates for designation as a line-of-sight path. From the in-range signal paths, a path that most closely matches the motion data 314 and the beamforming data 328 may be selected as the line-of-sight path, such as by performing the process 400 or the process 500 upon only the candidate signal paths that are in-range.

In the above described embodiments, the remote device may not have motion sensors or a beamforming antenna itself, as the techniques disclosed herein are enabled by a "one-sided" implementation where the local device 102 performs the sensor fusion techniques disclosed herein to estimate a line-of-sight path. However, in some embodiments, a two-sided approach to inter-device bearing estimation may be utilized where the remote device, such as the remote device 202, may utilize some or all of the components of the mobile device 300 described with reference to FIG. 3 to make its own local bearing estimation. As such, the remote device bearing estimation may be used to improve the accuracy of the estimation at the local device 102. For example, the remote device 202 may wirelessly transmit, to the local device 202, its own bearing estimation of the local device 102 relative to the remote device 202, and that estimation may be compared to the bearing estimation made by the local device 102 to determine the higher confidence bearing estimation. In this scenario, the local device 102 or the remote device 202 may translate or convert the remote device bearing estimation into a frame of reference of the local device 102 for ease of comparison with the local device bearing estimation.

In one illustrative example, agreement between the motion data 314 and the beamforming data 328 according to the localization model 330 may be ascertained at the local device 102 and the remote device 202 independently, and the device that has a better agreement according to the localization model 330 may be chosen as the estimate for the line-of-sight path for bearing determination between the two devices. In this scenario, each device may report motion data 314, beamforming data 328, and/or its ascertained model agreement to the other device to make the determination as to which device has the better estimation of the line-of-sight path.

In some embodiments, a fixed external factor may be utilized to enhance or further refine a first level estimation of the line-of-sight path using, for example, the process 400 or the process 500. For example, magnetic North may be detectable by a magnetometer or compass of the local device 102 and used as a fixed point of reference to constrain the possible solutions for a line-of-sight path determination. Additionally, or alternatively, a camera or 3D sensor of the local device 102 may be used to assess a geometry of a room, or to detect visible features (e.g., a fixture, spot on a ceiling or wall, etc.) in the environment to deduce the possible reflection and line-of-sight paths, and/or determine whether estimates from both the local device 102 and the remote device 202 are in substantial agreement.

In yet other embodiments, distance or ranging estimations may be made by the ranging system 318 of the local device 102 to estimate a distance of the remote device 202 from the local device 102 for refinement of the first level bearing estimation. For example, the ranging system 318 may be configured to measure a round trip ToF of radio signals transmitted to the remote device 102 and returned by the remote device 102 along available signal paths. The signal path with the shortest round-trip time may be estimated as the line-of-sight path. This technique may be employed where the process 500 proceeds to 524 as determining that the current communication path is a reflection path so that the line-of-sight estimator 326 may determine, using a ranging technique, which of the other available signal paths might be the line-of-sight path. Other ranging techniques such as signal strength detection may be utilized to deduce relative distance between the local device 102 and the remote device 202 along different signal paths. Discontinuities in these distance measurements along multiple signal paths may indicate a change in the number of reflections, and tracking this information over time may result in an increasingly reliable indication of which signal paths are line-of-sight paths and which are reflections.

In some embodiments, the localization model 330 may be configured to interpret the aforementioned distance or ranging information to constrain the solution set of possible bearing estimations by recognizing possible, or at least probable movement, and impossible, or at least improbable movement, of the local device 102. For example, if the motion data 314 reveals a certain movement or rotation of the local device 102, and the beamforming data 328 reveals vastly different changes in relative direction and/or location between the local device 102 and the remote device 202, the localization model 330 may utilize distance or range estimations to deduce, based on relative distance between devices, which motions are more or less probable or outright impossible. For example, devices at greater estimated distances from each other that reveal certain movement from the motion data 314 may require that the devices are moving at unrealistic velocities (e.g., hundreds of miles per hour) which may indicate that there is drift in the motion sensors 312, and the line-of-sight estimator 326 may rely more heavily on the beamforming data 328 in that case by ignoring the unrealistic motion data 314. Other physics constraints may be utilized to constrain probable device motion to traversing points from an origin to an end point at realistic velocities and accelerations to assist the line-of-sight estimator 326 in making bearing estimations.

In some embodiments, power management functions may be enabled by turning the line-of-sight estimation process "on" or "off" according to trigger events detected by the local device 102 to conserve power resources (e.g., batteries). For example, motion detection by the motion sensor(s) 312 may trigger the process 400 or the process 500 such that the bearing estimation is not recomputed while the local device 102 is at rest.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A method comprising:
designating a first communication path between a first computing device and a second computing device as a line-of-sight path between the first and the second computing devices, the first computing device being in a first orientation;
detecting that the first computing device is in a second orientation different from the first orientation;
determining a second communication path between the first computing device and the second computing device;
determining that the first communication path is rotated from the second communication path by a first angle in a first direction;
determining that the first communication path is rotated from the second communication path by a second angle in a second direction;
determining that the first angle is smaller than the second angle;
determining, based at least in part on motion data generated by one or more motion sensors of the first computing device, that the first computing device has moved from the first orientation to the second orientation in the first direction; and
designating the second communication path as the line-of-sight path.

2. The method of claim 1, further comprising storing data for a bearing estimation that indicates that the line-of-sight path is along the second communication path, the bearing estimation, upon storing the data, being included in a data store containing a history of bearing estimations of the second computing device relative to the first computing device.

3. The method of claim 2, further comprising:
   detecting that the first computing device is in a third orientation different from the second orientation;
   determining an azimuth angle range or an elevation angle range, relative to the first computing device, based on a predetermined number of the bearing estimations in the history;
   excluding, from consideration as the line-of-sight path, a first signal path, among multiple available signal paths, directed, relative to the first computing device, outside of the azimuth angle range or the elevation angle range, the multiple available signal paths making up a multi-path propagated wireless signal received by the first computing device and being determined from beam-forming data that includes information associated with the multiple available signal paths; and
   designating, among remaining signal paths of the multiple available signal paths directed within the azimuth angle range or the elevation angle range, a second signal path as the line-of-sight path.

4. The method of claim 3, wherein the second signal path is a third communication path between the first computing device and the second computing device.

5. The method of claim 1, further comprising:
   detecting that the first computing device is in a third orientation different from the second orientation;
   determining a third communication path between the first computing device and the second computing device;
   determining that the second communication path is rotated from the third communication path by a third angle in the first direction;
   determining that the second communication path is rotated from the third communication path by a fourth angle in the second direction;
   determining that the third angle is smaller than the fourth angle;
   determining, based at least in part on subsequent motion data generated by the one or more motion sensors, that the first computing device has moved from the second orientation to the third orientation in the second direction; and
   designating the third communication path as a reflection path.

6. The method of claim 5, further comprising selecting a different signal path, from among multiple available signal paths between the first computing device and the second computing device, as the line-of-sight path.

7. The method of claim 5, further comprising:
   measuring a first round-trip time-of-flight (ToF) of first radio signals transmitted along a first signal path, from among multiple available signal paths, between the first computing device and the second computing device;
   measuring a second round-trip ToF of second radio signals transmitted along a second signal path, from among the multiple available signal paths, between the first computing device and the second computing device;
   determining that the second round-trip ToF is less than the first round-trip ToF; and
   selecting the second signal path as the line-of-sight path.

8. The method of claim 5, further comprising:
   determining respective distances between the first computing device and the second computing device along individual signal paths, from among multiple available signal paths; and
   selecting a signal path, from among the multiple available signal paths, as the line-of-sight path.

9. The method of claim 1, wherein the first computing device is at a first location while in the first orientation, the method further comprising, prior to determining the second communication path, detecting that the first computing device is at a second location different from the first location.

10. A first computing device comprising:
    one or more motion sensors to generate motion data in response to movement of the first computing device;
    an antenna to wirelessly receive or transmit signals along a communication path between the first computing device and a second computing device;
    a processor; and
    memory storing instructions that, when executed by the processor, cause the first computing device to perform operations comprising:
      designating a first communication path between the first computing device and the second computing device as a line-of-sight path between the first computing device and the second computing device, the first computing device being at a first location;
      detecting that the first computing device is at a second location different from the first location;
      determining a second communication path between the first computing device and the second computing device;
      determining that the first communication path is rotated from the second communication path by a first angle in a first direction;
      determining that the first communication path is rotated from the second communication path by a second angle in a second direction;
      determining, based at least in part on the motion data, that the first computing device has changed in orientation in the first direction; and
      designating the second communication path as the line-of-sight path.

11. The first computing device of claim 10, the operations further comprising storing data for a bearing estimation that indicates that the line-of-sight path is along the second communication path, the bearing estimation, upon storing the data, being included in a data store containing a history of bearing estimations of the second computing device relative to the first computing device.

12. The first computing device of claim 11, the operations further comprising:
    detecting that the first computing device is at a third location different from the second location;
    determining an azimuth angle range or an elevation angle range, relative to the first computing device, based on a predetermined number of the bearing estimations in the history;
    excluding, from consideration as the line-of-sight path, a first signal path, among multiple available signal paths, directed, relative to the first computing device, outside of the azimuth angle range or the elevation angle range, the multiple available signal paths making up a multi-path propagated wireless signal received by the first computing device and being determined from beamforming data that includes information associated with the multiple available signal paths; and designating, among remaining signal paths of the multiple available signal paths directed within the azimuth angle range or the elevation angle range, a second signal path as the line-of-sight path.

13. The first computing device of claim 12, wherein the second signal path is a third communication path between the first computing device and the second computing device.

14. A method comprising:

designating a first communication path between a first computing device and a second computing device as a line-of-sight path between the first computing device and the second computing device, the first computing device being in a first orientation;

detecting that the first computing device is in a second orientation different from the first orientation;

determining a second communication path between the first computing device and the second computing device;

determining that the first communication path is rotated from the second communication path by a first angle in a first direction;

determining that the first communication path is rotated from the second communication path by a second angle in a second direction;

determining that the first angle is smaller than the second angle;

determining, based at least in part on motion data generated by one or more motion sensors of the first computing device, that the first computing device has moved from the first orientation to the second orientation in the second direction; and estimating the line-of-sight path.

15. The method of claim 14, wherein estimating the line-of-sight path further comprises selecting a different signal path, from among multiple available signal paths between the first computing device and the second computing device, as the line-of-sight path.

16. The method of claim 14, wherein estimating the line-of-sight path further comprises:

measuring a first round-trip time-of-flight (ToF) of first radio signals transmitted along a first signal path, from among multiple available signal paths, between the first computing device and the second computing device;

measuring a second round-trip ToF of second radio signals transmitted along a second signal path, from among the multiple available signal paths, between the first computing device and the second computing device;

determining that the second round-trip ToF is less than the first round-trip ToF; and selecting the second signal path as the line-of-sight path.

17. The method of claim 14, wherein estimating the line-of-sight path further comprises:

determining respective distances between the first computing device and the second computing device along individual signal paths, from among multiple available signal paths; and selecting a signal path, from among the multiple available signal paths, as the line-of-sight path.

18. The method of claim 14, further comprising referencing a localization model used to interpret the motion data and the second communication path.

19. The method of claim 14, wherein the first computing device is at a first location while in the first orientation, the method further comprising, prior to determining the second communication path, detecting that the first computing device is at a second location different from the first location.

20. The method of claim 19, wherein estimating the line-of-sight path is further based at least in part on the first location, an average velocity of the first computing device over a time elapsed during movement from the first location to the second location, and a direction of the movement.

* * * * *